United States Patent
Kolb

(10) Patent No.: US 8,408,283 B2
(45) Date of Patent: Apr. 2, 2013

(54) HEAT EXCHANGER FIN WITH RIBBED HEM

(75) Inventor: John A. Kolb, Old Lyme, CT (US)

(73) Assignee: Centrum Equities Acquisition, LLC, Nashville, TN (US)

( * ) Notice: Subject to any disclaimer, the term of this patent is extended or adjusted under 35 U.S.C. 154(b) by 584 days.

(21) Appl. No.: 11/770,210

(22) Filed: Jun. 28, 2007

(65) Prior Publication Data

US 2009/0000776 A1 Jan. 1, 2009

(51) Int. Cl.
*F28D 1/02* (2006.01)

(52) U.S. Cl. .......................... 165/152; 165/153; 165/906

(58) Field of Classification Search .................. 165/152, 165/153, 906
See application file for complete search history.

(56) References Cited

U.S. PATENT DOCUMENTS

| | | | |
|---|---|---|---|
| 2,410,140 A | 10/1946 | Young | |
| 4,958,681 A * | 9/1990 | Kadle | 165/151 |
| 5,361,829 A | 11/1994 | Kreutzer et al. | |
| 5,669,438 A | 9/1997 | Baeles et al. | |
| 5,752,567 A | 5/1998 | Obosu | |
| 6,170,566 B1 | 1/2001 | Blumel et al. | |
| 6,672,376 B2 | 1/2004 | Shembekar et al. | |
| 6,918,432 B2 | 7/2005 | Ozaki | |
| 7,866,042 B2 * | 1/2011 | Kolb | 29/890.03 |
| 2003/0075307 A1 * | 4/2003 | Stoynoff et al. | 165/135 |
| 2007/0193730 A1 * | 8/2007 | Ozaki | 165/140 |
| 2008/0169091 A1 * | 7/2008 | Kolb | 165/152 |

* cited by examiner

*Primary Examiner* — Brandon M Rosati
(74) *Attorney, Agent, or Firm* — DeLio & Peterson, LLC

(57) ABSTRACT

A serpentine fin for assembly between tubes in a heat exchanger core, and a method of making same from a metal strip. The strip edges have a hem comprising a double thickness of the strip material extending inward from the edge. The metal strip has folds extending across the strip width such that the strip forms a serpentine shape, with the folds being adapted to contact the tubes in the heat exchanger core. Multiple rows of split louvers are disposed between adjacent folds. Each row of split louvers comprises louvers having openings extending in the direction of the strip length and formed in a pair of adjacent, spaced louver banks. Ribs are disposed parallel to the louver openings adjacent the strip edges and in at least one center portion of the strip between the strip edges, and extend across the pair of louver banks.

12 Claims, 10 Drawing Sheets

HEAT EXCHANGER FIN WITH RIBBED HEM

BACKGROUND OF THE INVENTION

1. Field of the Invention

The present invention relates to the manufacture of heat exchangers and the manufacture of fins for heat exchanger cores primarily used in motor vehicles.

2. Description of Related Art

In the manufacturing of cores for motor vehicle radiators, charge air coolers and other air-cooled heat exchangers, serpentine fins formed from thin gauge metal strip such as copper or aluminum are placed between and in contact with the tubes which carry the fluid to be cooled. The heat exchanger core tubes typically extend between the manifolds, or the inlet and outlet tanks, of the heat exchanger. The fins are the chief heat exchange medium between the coolant and the ambient air. The ability of the fins to transfer heat from the tubes to the air passing over the fins greatly relies on the design of the fins, with some including dimples or protrusions to aid in the heat transfer. To increase the heat transfer rate even further, louvers have been incorporated into the fins. The louvers turbulate the air in a manner which has been found to increase the efficiency of the radiator. The louver configuration may be so-called full louvers, where each louver in the row extends over essentially the entire distance between the tubes, or split louvers, where two side-by-side banks of louvers are employed in the row, so that each of the two louvers extends over less than half of the distance between each tube.

Many heat exchangers employ such serpentine fins, in which a flat metal strip is folded into convolutions to create the multiple fins between spaced tubes. When louvers are incorporated into the fins, the structural integrity of the fin is compromised. Reinforcements to serpentine heat exchanger fins have been described in U.S. Pat. Nos. 5,361,829 to Kreutzer et al and U.S. Pat. No. 6,918,432 to Ozaki, as well as in U.S. Pat. No. 7,866,042 entitled "Method for Producing a Split Louver Heat Exchanger Fin" by this inventor, which application is hereby incorporated by reference. Such reinforcements have been added to serpentine fins for several reasons. The first, as stated by Kreutzer, is to provide support for flat heat exchanger tubes against bulging due to internal pressure. A second reason, as stated by Ozaki, is to prevent distortion of the fins during washing of the core with water at high pressure. A third reason, as stated by this inventor in U.S. Pat. No. 7,866,042, is to allow air-forming of louvered serpentine fins. Additionally, serpentine fins are subject to compressive forces during the heat exchanger manufacturing operation of stacking the fins and tubes to make a core assembly. The stacked assembly of fins and tubes is held clamped under pressure during the subsequent soldering or brazing of the core. It has been found that the compressive strength of the serpentine fin is key to obtaining good fin-to-tube contact in the completed core. It has also been found that strengthening the front and rear face of the core by stiffening the leading and trailing edges of the fins provides protection to the core against damage due to handling during manufacturing, shipping and installation, as well as protection in service against damage due to road debris. All of these concerns are aggravated by the desire to use thinner fin materials to save weight and cost.

SUMMARY OF THE INVENTION

Bearing in mind the problems and deficiencies of the prior art, it is therefore an object of the present invention to provide an improved method for manufacturing louvered serpentine fins using an air-forming process.

It is another object of the present invention to provide a method for manufacturing split louvered serpentine fins which is cost-effective, yet produces a quality fin.

A further object of the invention is to provide a method for manufacturing louvered serpentine fins which does not decrease the structural integrity of the fin, and optionally adds increased structural integrity against forces created during the manufacturing process.

It is yet another object of the present invention to provide a method for manufacturing split louvered serpentine fins which results in fins having consistently high efficiency and heat transfer rates.

A further object of the invention is to provide a heat exchanger fin which will have exceptional strength against bulging of the core due to internal pressure, against distortion to the fins due to pressure washing, and against damage in service due to road debris.

Another object of the invention is to provide a heat exchanger fin which has a ribbed hem, for use in a serpentine or plate-type fin.

Yet another object of the invention is to provide an improved method of air forming a serpentine heat exchanger fin using a ribbed hem.

Still other objects and advantages of the invention will in part be obvious and will in part be apparent from the specification.

The above and other objects, which will be apparent to those skilled in the art, are achieved in the present invention which is directed to fins for a heat exchanger core.

The present invention provides a serpentine fin for assembly between tubes in a heat exchanger core comprising a metal strip having a width between opposite strip edges and a length greater that the width. The strip edges have a hem formed thereon comprising a double thickness of the strip material extending a portion of the distance inward from the edge. The metal strip has folds extending across the strip width such that the strip forms a serpentine shape, with the folds being adapted to contact the tubes in the heat exchanger core. The serpentine fin also includes at least one row of louvers between adjacent folds. The at least one row of louvers comprises louvers having openings extending in the direction of the strip length and formed in adjacent, spaced louver banks extending at least a portion across of the width of the strip. The serpentine fin further includes ribs substantially parallel to the louver openings adjacent the strip edges and in at least one center portion of the strip between the strip edges, the ribs extending across the louver banks.

In the serpentine fin, the hem may extend over a portion of the rib, may extend fully into the rib, or may extend fully into the rib and associated louver. The rib may form a V-shaped channel or a U-shaped channel. Preferably, the louvers are formed at an angle to a plane of the metal strip and the louver angle is between about 26 degrees and about 32 degrees.

Preferably, the metal strip has a thickness and the ribs have a height extending from a plane of the metal strip, and the ratio of the height to the thickness of the metal strip is between about 4 and 5. The ribs are preferably elongated, plastically deformed sections and include at least one angled leg connected to an adjacent louver.

In yet another aspect, the present invention provides a plate-type flat fin for a heat exchanger core having at least one hem along at least a portion of an edge, wherein the hem comprises a double thickness of the strip material extending a portion of the distance inward from the edge; and at least one rib in the hem formed by plastically deforming the metal strip. The fin plate preferably includes louvers.

The present invention also provides an improved method for manufacturing louvered serpentine fins by air forming. The preferred method comprises providing a flat metal strip for making heat exchanger fins, the strip having a width between opposite strip edges and a length greater than the width. Each of the opposite strip edges is a hemmed edge comprising a double thickness of the flat metal strip and extending a portion of the distance inward from the edges to form a hem. The method includes forming in the strip, while the strip is substantially flat, multiple rows of louvers. Each row of louvers comprises louvers having openings extending in the direction of the strip length and formed in adjacent, spaced louver banks extending at least a portion across the width of the strip. At least one rib is formed in the strip, which rib is substantially parallel to the louver openings and extends across the louver banks. The metal strip has unformed portions extending across the strip width between rows of strip louvers and ribs for forming folds across the width of the strip. After forming the rows of louvers, the method includes applying an initial pressure to the metal strip to cause the substantially flat strip to buckle in the unformed portions and begin to form folds in the strip, with at least one row of louvers between adjacent folds along the length of the strip, and thereafter applying further pressure to the metal strip to complete formation of the folds of the strip to form the serpentine fin. The distance between the adjacent folds conforms to the desired spacing distance between the heat exchanger core tubes.

The method preferably includes folding each of the opposite strip edges to form the hemmed edge, such that the hem extends over a portion of the rib, the hem extends fully into the rib, or the hem extends fully into the rib and associated louver.

In the air forming method the strip is continually moving. The initial pressure is a backpressure applied by contacting the strip at a first location and the further pressure is a further backpressure applied by contacting the strip at a second location downstream of the first location with respect to strip movement.

The rib may be formed adjacent the strip edges and/or in a center portion of the strip between the strip edges. The rib is preferably an elongated, plastically deformed section and may include at least one angled leg connected to an adjacent louver. The louvers preferably have ends adjacent the unformed portions of the metal strip and wherein after applying the further pressure to the metal strip, the distance between the louver ends and the folds at the unformed portions is substantially equal.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
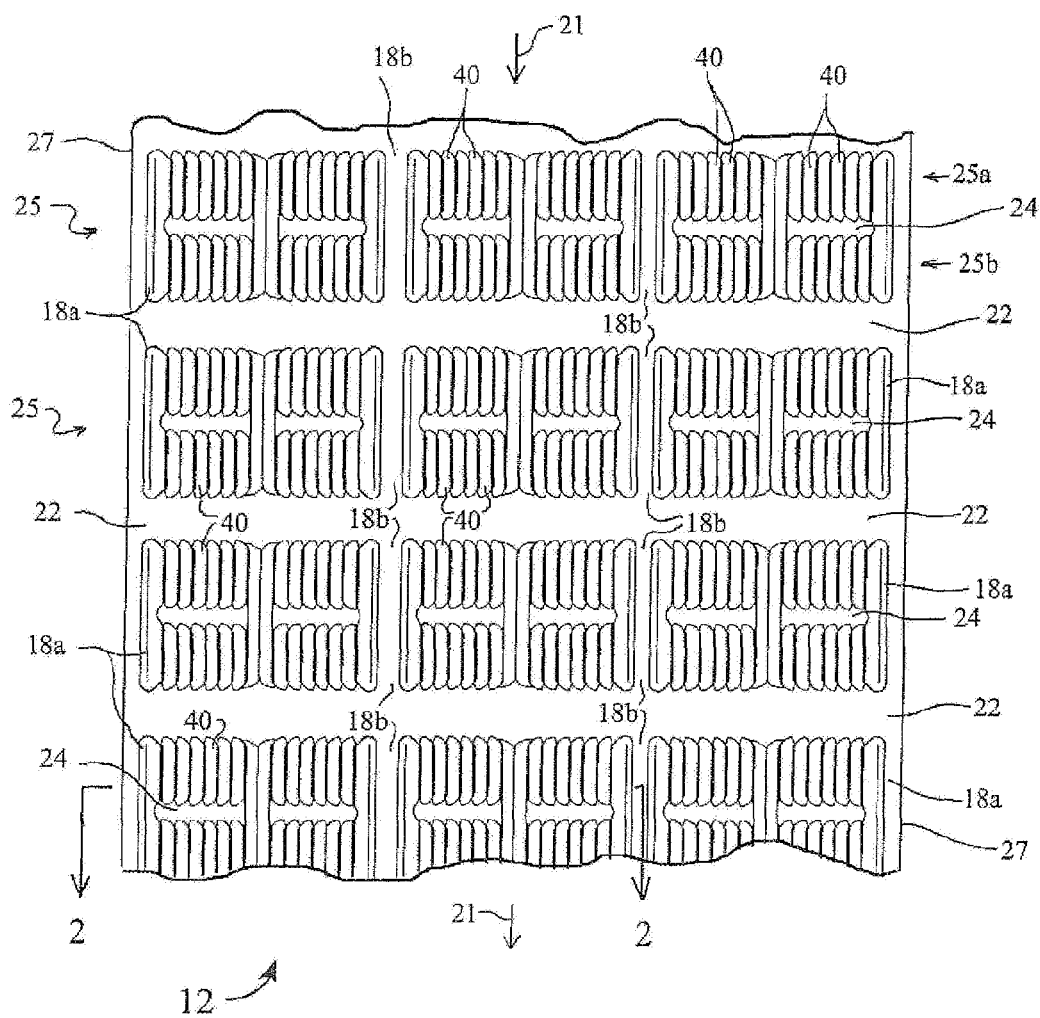
FIG. 1 is a top plan view of a metal strip having split louvers formed therein in accordance with the present invention.
Figure 2:
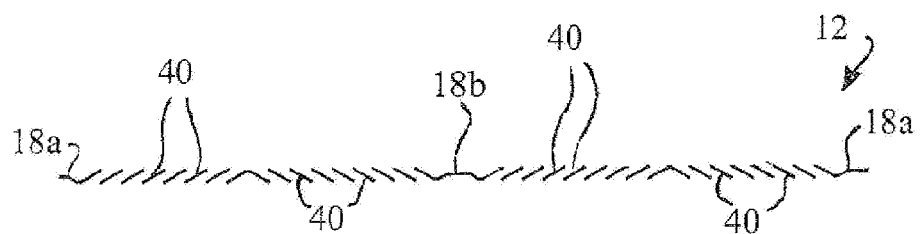
FIG. 2 is a cross sectional view of the split louvers of FIG. 1 along line 2-2.

In describing the preferred embodiment of the present invention, reference will be made herein to FIGS. 1-18 of the drawings in which like numerals refer to like features of the invention.

FIGS. 1-4 depict a split louver fin configuration formed in a flat metal strip in accordance with the present invention, prior to forming the serpentine convolutions. A length of metal strip 12 of aluminum or preferably copper has split louvers 40 extending in rows 25 across the width of the strip, ribs 18a and 18b formed adjacent the louvers within the rows, and unformed portions 22 extending across the strip width between rows of the louvers. The louvers are formed by cutting the strip and twisting and plastically deforming the cut portions. The opposite ends of each of the louvers maintain connection with the remaining metal strip by a twist portion. Each row 25 of split louvers is made up of a pair of banks 25a, 25b of individual louvers 40, which are separated from each other by unformed portion 24 extending in the direction of the strip width. The adjacent, spaced louver banks 25a, 25b extend across at least a portion of the width of the strip 12, and preferably extend across substantially all of the strip width. The louvers 40, the openings between the louvers, and ribs 18a, 18b extend in the direction of the strip length 21.

Figure 3:
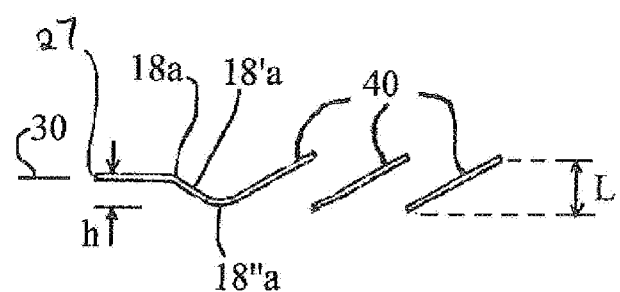
FIG. 3 is a close up view of the portion of FIG. 2 in the vicinity of the end rib in the split louvers, wherein the strip edge has a single thickness.
Figure 4:
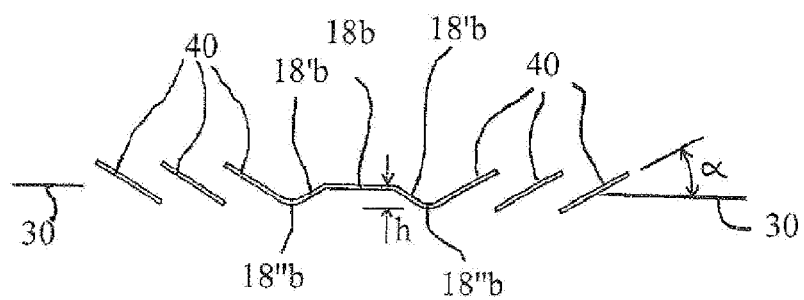
FIG. 4 is a close up view of the portion of FIG. 2 in the vicinity of the center rib in the split louvers.

Ribs 18a, 18b are plastically deformed in the strip substantially parallel to the louver openings in the direction of the strip length and extend substantially completely across the pair of louver banks 25*a*, 25*b*, including across the unformed strip portion 24 between the louver banks. End ribs 18*a* are located near the strip edges 27 and center ribs 18*b* are located in center portions of the strip between the strip edges. Ribs 18*a*, 18*b* extend across the pair of louver banks, but not beyond the ends of the louvers into the unformed sections 22 separating the rows of louvers. End ribs 18*a* shown in the detailed view of FIG. 3 have plastically deformed portions and include one angled leg 18'*a* extending at an angle downward from the plane 30 of the undeformed metal strip and a bent portion 18"*a* that connects to the adjacent louver 40. The end ribs are ultimately positioned, after assembly of the fin in the core, near the upstream and downstream ends of the fin relative to the direction of cooling airflow. Center ribs 18*b* shown in the detailed view of FIG. 4 also have plastically deformed portions with angled legs 18'*b* extending at an angle downward from an undeformed metal strip portion in plane 30 and bent portions 18"*b* that connect to the adjacent split louvers 40. The number and spacing of center ribs 18*b* among the louvers in each row may be determined according to the strength requirements of the strip during air forming, as will be described in more detail below. As shown in FIGS. 3 and 4, each split louver 40 has a total height L and is angled at an angle $\alpha$ from the neutral plane 30 of the undeformed metal strip 12. In one preferred embodiment, the strip and louvers have a thickness of about 0.0022 in. (0.056 mm), and the louvers have angle $\alpha$ of about 30° and height L of about 0.023 in. (0.58 mm). The ribs have a height distance h in one direction from the neutral plane of about 0.0104 in. (0.26 mm). The ratio of h/s is about 4.7, and signifies that the height of the rib is about 4.7 times the thickness of the fin material.

Figure 5:
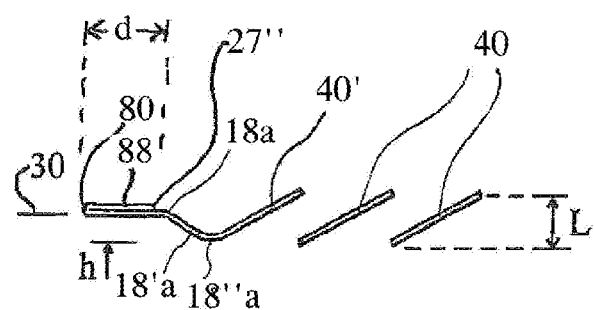
FIG. 5 is a close up view of the portion of FIG. 2 in the vicinity of the end rib in the split louvers, wherein the strip edge has a double thickness, hemmed edge extending toward the end rib.
Figure 6:
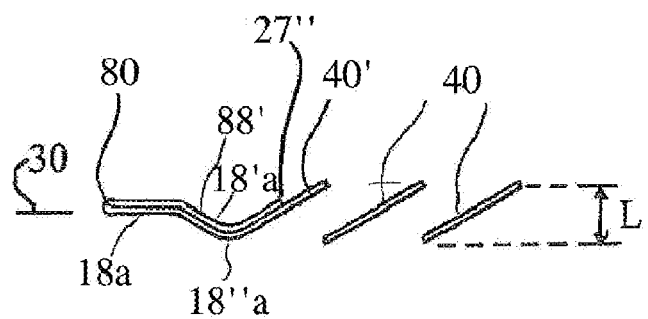
FIG. 6 is an alternate embodiment of FIG. 5, wherein the double thickness of the hemmed edge extends fully over the end rib.
Figure 7:
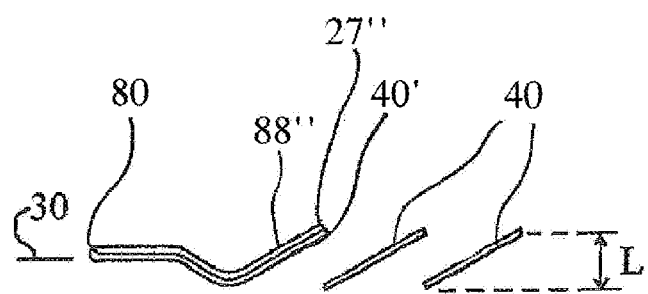
FIG. 7 is another embodiment of FIG. 5, wherein the double thickness of the hemmed edge extends fully into the end rib and the associated louver.

The metal strip may be made with a single thickness edge as shown in FIG. 3, where edge 27 is of the same thickness as the remainder of the strip material. However, in the preferred embodiment, to add structural integrity to the fin, the metal strip may include a hem along each of the opposite edges along which the end ribs are formed. The hem comprises a double thickness of the metal strip material and extends at least a portion inward from the edge. The distance to which the hem extends inward may vary as shown in the embodiments of FIGS. 5-7. The hem 88 is formed by folding a portion of the original cut metal strip edge 27 (FIGS. 1 and 3), thereby forming a double thickness of the metal strip, and is described further below. The result is that the original cut metal edge is now inward 27" by distance d of the new hem edge 80 along which the metal strip is folded and which now forms the leading and trailing edges of the final heat exchanger product. This distance d of the fold may vary, as described below.

Similar to the embodiment shown in FIG. 3, the invention having the hemmed edges also includes end ribs 18*a* having a plastically deformed angled leg 18*a*' and a bent portion 18*a*". The embodiment shown in FIG. 5 has the hem extending only a portion of the distance from the hem edge 80 to the end rib 18*a*, wherein no portion of the end rib 18*a* or the associated louver 40' is in the hemmed area. Preferably, as shown in FIG. 6, the hem 88' extends from the hem edge 80 to a point partially or fully encompassing the end rib 18*a*, and more preferably, the hem 88" extends fully into the end rib and partially or fully into the associated louver 40'. In other words, the end rib adjacent the edges of the metal strip may comprise a double thickness of the metal strip in part of the rib, in the entire rib or the entire rib along with a portion or the entirety of the associated louver. The associated louver 40' is defined as the louver formed with and is attached to the adjacent end rib 18*a*.

By folding over the leading and trailing edges of the serpentine fin, the formed hem of double thickness provides structural integrity to the fin, both from forces encountered during use of the heat exchanger, and from compression forces incurred during the manufacturing of the heat exchanger. This structural reinforcement is improved further when the end rib 18*a* is formed in the hemmed area, either partially embedded in the hem or fully embedded in the hem. The hem may extend far enough inward to also incorporate the associated louver either partially or fully, increasing the resistance to external forces even further. This embodiment results in exceptional rigidity and provides superior resistance to fin and core damage.

Figure 8:
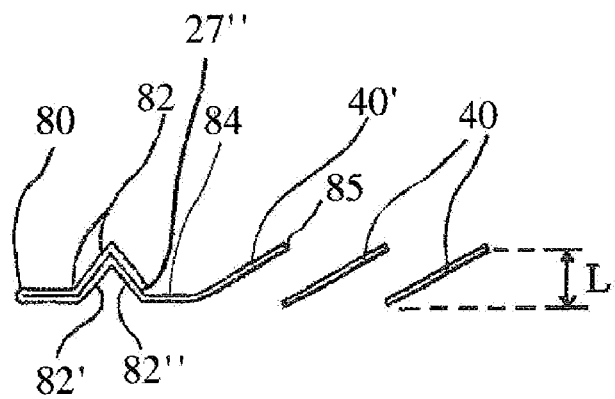
FIG. 8 is yet another embodiment of FIG. 5, wherein the rib is a sharp peak with the hemmed edge extending thereunder.
Figure 9:
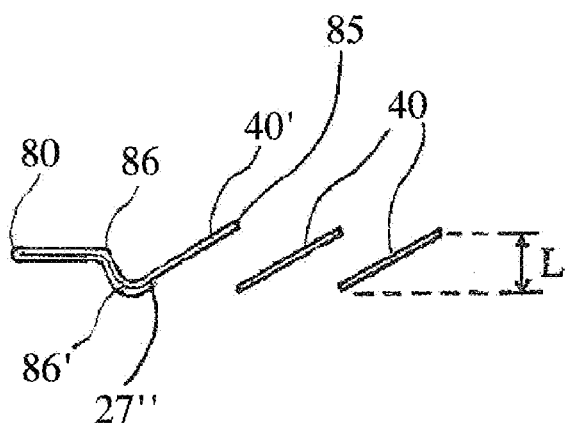
FIG. 9 is a further embodiment of FIG. 5, wherein the rib is a downward facing curved peak with the hemmed edge extending thereover.
Figure 10:
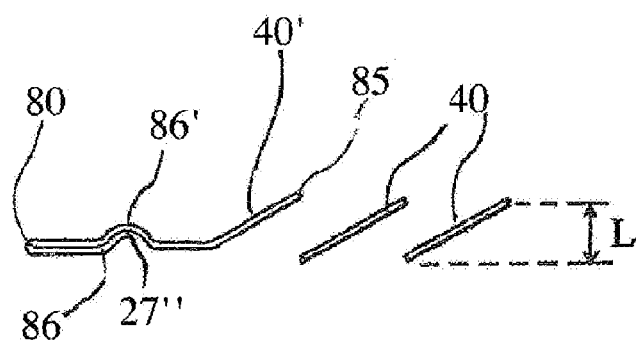
FIG. 10 is another embodiment of FIG. 5, wherein the rib is an upward facing curved peak with the hemmed edge extending thereunder.

FIGS. 8-10 shows examples of a rib 82 embedded in the hemmed area wherein the rib has various cross-sectional patterns. FIG. 8 shows a rib having cross-sectional pattern with a sharp peak formed by angled legs 82', 82" with the tip of the peak positioned upward in the same direction as the open edge 85 of the associated louver with respect to the neutral plane 30 of the unformed metal strip. FIG. 9 shows a rib having a curved peak 86 with the crest of the peak 86' downward facing, opposite the direction of the open edge of the associated louver and FIG. 10 has a curved peak 86 with the crest of the peak facing upward in the same direction as the open edge of the associated louver. The variations in the cross sectional patterns of the rib, the distance to which the hem extends to or into the rib and associated louver, and the direction the peak of the rib faces may be further combined in a multitude of embodiments not specifically described.

The ribbing of the hemmed area may also be incorporated into the design and manufacturing of plate-type flat fins. In this aspect of the invention, the plate-type fin is hemmed along at least one of the fin edges and includes at least one rib formed in the hemmed area. This embodiment is not formed into a serpentine fin, but remains essentially flat, and gives the plate-type fin resistance to damage during handling of the fins during manufacture and transport and against stresses during use of the heat exchanger core.

Figure 11:
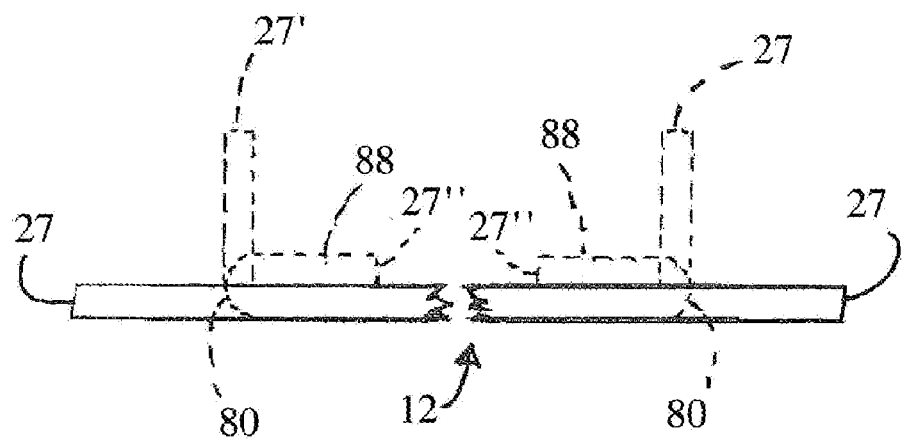
FIG. 11 is a cross-sectional elevational view, perpendicular to the length of the metal strip, showing the progressive formation of the hemmed edges.
Figure 12:
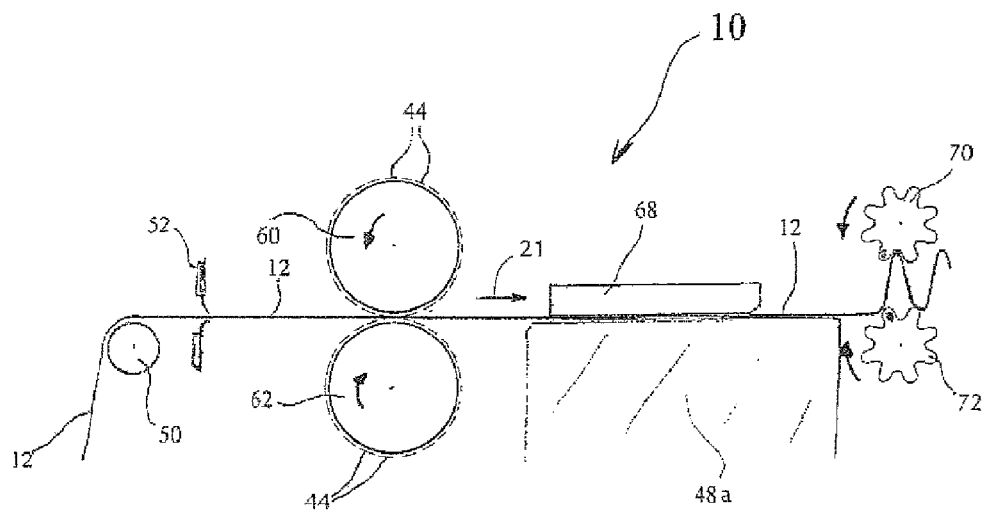
FIGS. 12-15 are side elevational views of an air forming machine showing the forming of the louvers and ribs by fin rolls, and the progression of the forming of the convolutions of the serpentine strip.

The fin of the present invention employing a ribbed hem may be made by conventional hard tooling or by air forming. The process of air forming the serpentine split louver fins of the present invention is shown in FIGS. 11-15, and begins by providing a coil of unformed metal strip for continuous feeding through a modified prior art air forming machine 10. Folding of the unformed metal strip edges to produce hemmed edges may be completed before the metal strip enters the air forming machine or as a step during the process of forming the heat exchanger fin after the metal strip is fed into the air forming machine. FIG. 11 shows the partial folding of cut strip edges 27 to a first position 27' and subsequently to the final folded position 27" to form hem 88. As shown in FIG. 12, the air forming machine 10 comprises a front roller 50 which guides the metal strip through a pair of opposing wiping pads 52, one on each side of the metal strip, for cleaning any contamination thereon. A pair of counter rotating fin rolls 60, 62 having a cylindrical shape are positioned downstream from the wiping pads with respect to the metal strip. If formation of the hem is to be made in the air forming machine, the folding operation may be made immediately after the wiping stage and prior to contact with the fin rolls. Fin rolls 60, 62 are sufficiently close to one another to exert a compression force on the surface of the moving metal strip in a direction normal to the strip plane, as well as move the strip continuously in direction 21. Unlike prior air forming machines, the surfaces of each of the fin rolls 60, 62 have a plurality of meshing cutter blades and tool patterns 44 which cut and form the split louvers 40 and ribs 18a, 18b in the metal strip, to the configuration shown in FIGS. 1-4.

As the fin rolls 60, 62 push the metal strip downstream 21, the formed metal strip passes between a backing plate 68 and a first base portion 48a, which contact the strip to maintain it in a substantially flat position. The metal strip 12 continues to move downstream from the backing plate and into contact with a pair of counter rotating folding shafts 70, 72 respectively positioned above and below the strip plane. Each folding shaft 70, 72 has a plurality of arms extending outward from the axis of rotation, and the ends of the arms are parallel to the strip width. As shown in FIG. 12, the metal strip contacts arms of the rotating lower folding shaft 72 and upper folding shaft, which arms provide an initial backpressure in a direction opposite to the motion of the strip in direction 21. In particular, the metal strip contacts one of the lower folding shaft 72 arms forcing an unformed portion 22 into a radius formed between shaft arms, creating the initial backpressure on the metal strip between the backing plate 68 and the lower folding shaft 72. As the backpressure is applied, strip 12 begins to buckle along a first unformed portion 22 between backing plate 68 and lower folding shaft 72. The unformed portions 22 of the metal strip have the least amount of structural integrity against forces which tend to make the metal strip bend across its width, while the split louvers and the ribs inhibit buckling and folding in the louver rows. The term air forming refers to the fact that the folds are made in a controlled fashion in air without the necessity to use male and female tool sections conforming to the desired degree of folding.

Figure 13:
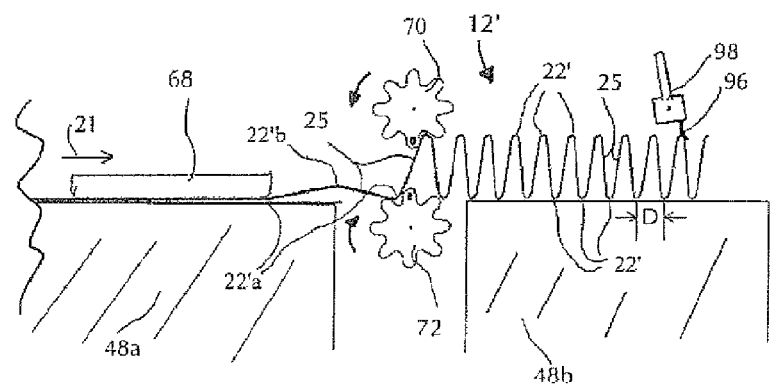
Figure 14:
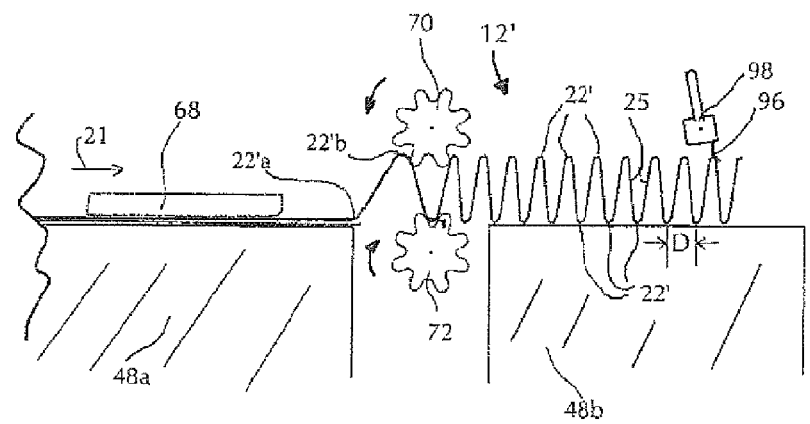
Figure 15:
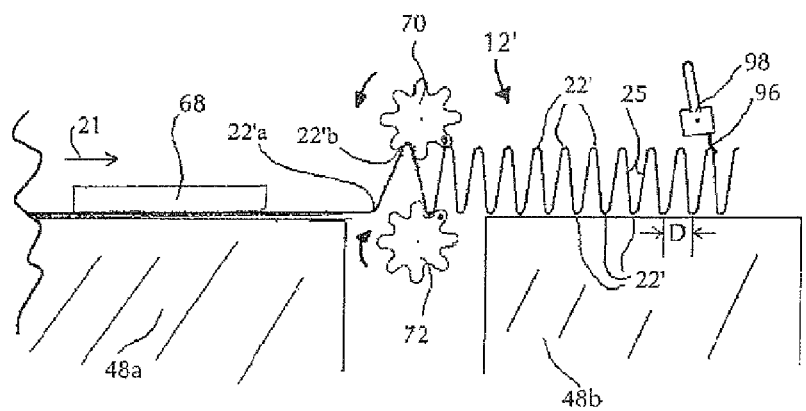

FIG. 13 shows the result of the initial backpressure causing the metal strip to buckle along the unformed portions 22'a creating a fold in one direction, and to buckle along the unformed portion 22'b creating a fold in the opposite direction. As the metal strip moves from backing plate 68 to folding shafts 70, 72, it continues to buckle, and additional folds 22'a, 22'b created along the adjacent unformed portions 22 to create the folds or convolutions in the strip between each row 25 of split louvers. The fold angles continue to increase as the strip approaches and passes between the folding shafts, as shown in FIGS. 14 and 15, which show the progression of the strip folding.

A further backpressure is applied to the convoluted strip by a gathering station downstream of the folding shafts, again in a direction opposite to the strip movement direction 21. As shown in FIGS. 13, 14, and 15, this gathering station, has fingers 96, preferably in the form of a metal brush, mounted on an adjustable lever 98 which sequentially contact the upper folds 22' of the convoluted strip as it passes in direction 21. The force of fingers 96 urges the convoluted strip against a second base portion 48b, and may be adjusted to apply sufficient backpressure to create the desired density of strip convolutions, i.e., the number of straight portions containing split louver fins 25 (between folds) in a distance D of formed serpentine fin strip 12'. This fin strip density is typically described as number of fins per inch. Increased backpressure at the gathering station produces a higher fin density, while lower backpressure at the gathering station results in a lower fin density. The air forming process continues until the final fold angle is obtained at folded unformed portions 22' to form the desired number of folds into a length of fin strip 12'. The fin strip 12' is subsequently cut to create the desired number of fins corresponding to the length of the tubes in the heat exchanger core.

Figure 16:
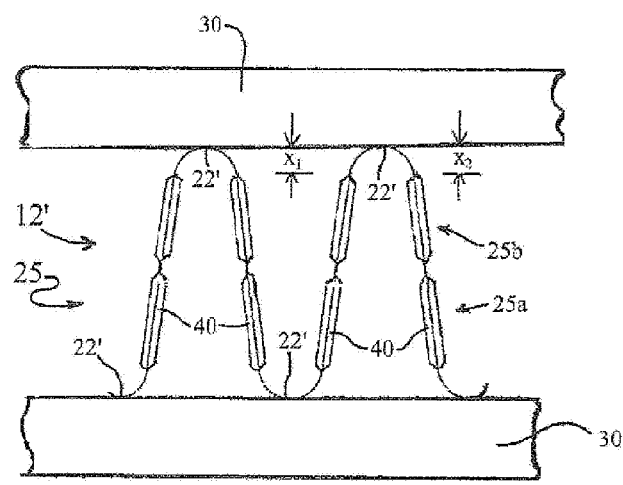
FIG. 16 is a front view of a portion of a heat exchanger core face showing a serpentine split louver fin of the present invention between heat exchanger core tubes.
Figure 17:
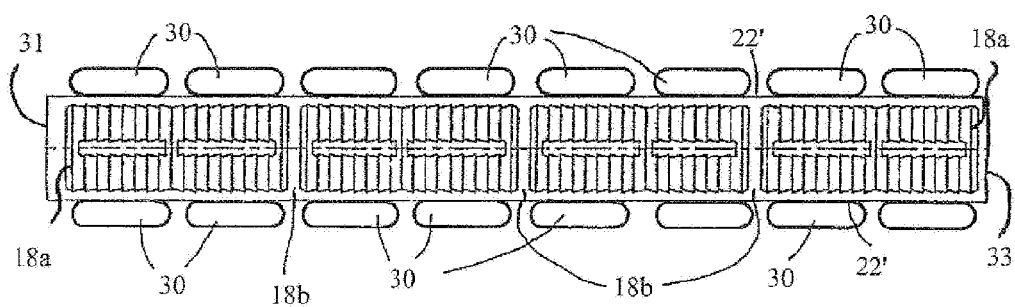
FIG. 17 is an end view of a heat exchanger core showing a serpentine split louver fin of the present invention between heat exchanger core tubes.
Figure 18:
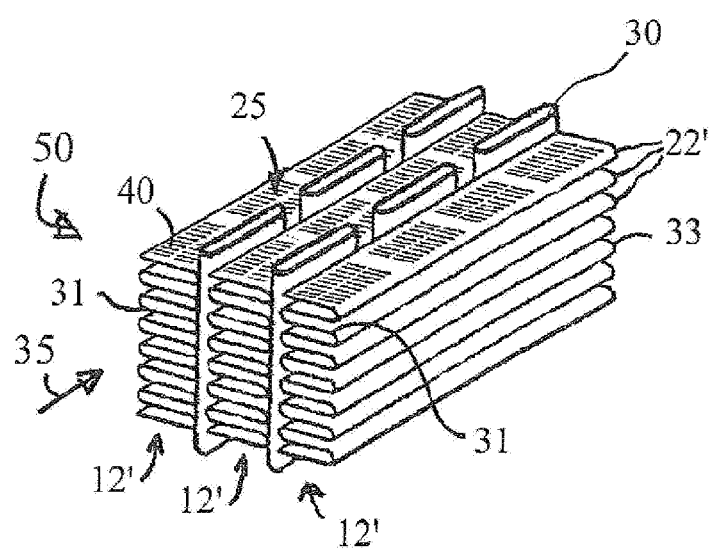
FIG. 18 is a perspective view of a portion of a heat exchanger core showing serpentine split louver fins of the present invention sandwiched between heat exchanger core tubes.

FIGS. 16, 17 and 18 show the completed serpentine fin strips 12' integrated with tubes 30 to form heat exchanger core 50. As shown in FIG. 18, incoming air flowing in direction 35 enters core 50 at leading fin edge 31 and exits at trailing fin edge 33. The serpentine fin strips 12' are stacked in an alternating pattern with the tubes, and then compressed and brazed to form the completed core.

One particular advantage of the use of ribs with the split louver serpentine fin made by air forming is shown in FIG. 16 with respect to the location of the ends of the individual louvers 40 from adjacent tubes 30. It is desirable to ensure that there is sufficient distance $x_1$ and $x_2$ between the louver ends and the tubes, so that the fold is confined to the unformed area between louver rows, and the ends of the louvers are not distorted, closed or crushed, or the louver angle changed, by the folding process. The present invention of air forming a split louver serpentine fin has been shown to provide such distance to avoid damage to the louvers, and more importantly, provide a consistent distance $x_1$, $x_2$ between the louver ends and the tubes, preferably where $x_1$ is substantially equal to $x_2$, to permit the as-built heat exchanger to come closer to the theoretical performance of the design. The ribs formed within the split louver give the louver banks more integrity in the structure during the air forming of the convolutions as well as in the production of the radiator core when the tubes and fin strips are stacked and brazed.

A serpentine fin which has a hemmed leading edge where the air enters the heat exchanger, and preferably hemmed leading and trailing edges, will provide for a heat exchanger which has greater structural integrity during the manufacturing process and during use. During the brazing process of attaching the fins to the tubes during manufacturing, the hemmed edges, and particularly the hemmed edges having ribs therein, allow for greater compression of the stacked fins and tubes without damaging or distorting the fins. During installation of the heat exchanger, the hemmed edges give the fins protection from distortion or damage from the installer and, in use of the final product, the hemmed edges protect the fins from damage due to road debris, power washing, and repair. The hemmed edges also aid in reinforcing the tubes during pressure cycling of the heat exchanger where the tubes have a tendency to expand or bulge from internal pressure of the heat exchanger.

Thus, the present invention provides an improved method for manufacturing split louvered serpentine fins using an air-forming process, which is cost-effective, yet produces a quality fin having consistently high efficiency and heat transfer rates. The invention also provides a serpentine fin with a hemmed leading edge and preferably, hemmed leading and trailing edges, including split louvers and reinforcement ribs which add increased structural integrity against forces created during the manufacturing process. Preferably at least one of the ribs is formed partially or fully within the hemmed area to provide exceptional rigidity to the leading and trailing edges of the heat exchanger fin, whether it is serpentine or plate-type. The resulting increased rigidity provides superior resistance to fin and core damage resulting from handling, shipping and installation, and from pressure washing and road debris in use in the vehicle. This increased rigidity permits the use of thinner fin materials while preserving the aforementioned fin resistance to core damage. The above applies to full-louver serpentine fins as well.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A serpentine fin for assembly between tubes in a heat exchanger core comprising:
    a metal strip having a width between opposite strip edges and a length greater than the width, the strip edges having a hem formed thereon comprising a double thickness of the strip material extending a portion of the distance inward from the edge, the metal strip having folds extending across the strip width such that the strip forms a serpentine shape with adjacent folds residing along a length of the strip material, the folds being adapted to contact the tubes in the heat exchanger core;
    at least one row of split louvers residing between the adjacent folds, the at least one row of split louvers comprising louvers having openings extending in the direction of the strip length and formed in adjacent, spaced louver banks extending at least a portion across of the width of the strip, the split louvers residing one over the other between the adjacent folds across the strip width; and
    ribs substantially parallel to the louver openings adjacent the strip edges and in at least one center portion of the strip between the strip edges, the ribs extending across the spaced louver banks, the ribs adjacent the strip edges being end ribs each having an angled leg and a bent portion whereby the hem extends from the hem edge along the angled leg and at least partially follows along the contour of the end rib bent portion.

2. The fin of claim 1 wherein the hem extends fully over and follows the contour of the end rib bent portion.

3. The fin of claim 2 wherein the hem extends fully over and follows the contour of the end rib bent portion and into the associated louver.

4. The fin of claim 1 wherein the rib forms a V-shaped channel.

5. The fin of claim 1 wherein the rib forms a U-shaped channel.

6. The fin of claim 1 wherein the split louvers are formed at an angle to a plane of the metal strip and the louver angle is between about 26 degrees and about 32 degrees.

7. The fin of claim 1 wherein the metal strip has a thickness and the ribs have a height extending from a plane of the metal strip, and wherein the ratio of the height to the thickness of the metal strip is between about 4 and 5.

8. The fin of claim 1 wherein the ribs are elongated, plastically deformed sections and include at least one angled leg connected to an adjacent louver.

9. A plate-type flat fin for a heat exchanger core having:
    at least one hem along at least a portion of an edge of the fin wherein the hem comprises a double thickness of the strip material extending a portion of the distance inward from the edge;
    at least one rib in the hem along at least a portion of an edge of the fin formed by plastically deforming the metal strip, the at least one rib having an angled leg and a bent portion whereby the hem extends from the hem edge along the angled leg and at least partially follows along the contour of the rib bent portion; and
    split louvers comprising a pair of adjacent spaced louver banks each having a louver, the split louvers reside one over the other and are separated from each other by an unformed portion of the strip material and reside across at least a portion of a width of the strip material, the split louvers having openings extending in a direction of the strip material length.

10. The fin of claim 9 wherein the fin plate includes multiple rows of split louvers.

11. The fin of claim 1 wherein the ribs do not extend into the folds of the strip.

12. The fin of claim 2 wherein the ribs do not extend into the folds of the strip.

* * * * *